United States Patent
Gascon et al.

(10) Patent No.: US 11,446,625 B2
(45) Date of Patent: Sep. 20, 2022

(54) ZONED FLUIDIZATION PROCESS FOR CATALYTIC CONVERSION OF HYDROCARBON FEEDSTOCKS TO PETROCHEMICALS

(71) Applicants: KING ABDULLAH UNIVERSITY OF SCIENCE AND TECHNOLOGY, Thuwal (SA); SAUDI ARABIAN OIL COMPANY, Dhahran (SA)

(72) Inventors: Jorge Gascon, Thuwal (SA); Youssef Saih, Thuwal (SA); Jullian Vittenet, Thuwal (SA); Lieven Gevers, Thuwal (SA); Wei Xu, Thuwal (SA); Isidoro Morales, Thuwal (SA); Ola Salah Ali, Thuwal (SA)

(73) Assignees: KING ABDULLAH UNIVERSITY OF SCIENCE AND TECHNOLOGY, Thuwal (SA); SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 17/288,629

(22) PCT Filed: Oct. 24, 2019

(86) PCT No.: PCT/IB2019/059144
§ 371 (c)(1),
(2) Date: Apr. 26, 2021

(87) PCT Pub. No.: WO2020/109885
PCT Pub. Date: Jun. 4, 2020

(65) Prior Publication Data
US 2021/0394145 A1    Dec. 23, 2021

Related U.S. Application Data

(60) Provisional application No. 62/771,789, filed on Nov. 27, 2018.

(51) Int. Cl.
*B01J 8/32* (2006.01)
*B01J 8/22* (2006.01)
*C10G 11/22* (2006.01)

(52) U.S. Cl.
CPC . *B01J 8/32* (2013.01); *B01J 8/22* (2013.01); *C10G 11/22* (2013.01);
(Continued)

(58) Field of Classification Search
CPC .... B01J 2208/00141; B01J 2208/00902; B01J 8/22; B01J 8/32; B01J 8/18; C10G 11/22;
(Continued)

(56) References Cited

U.S. PATENT DOCUMENTS

| | | | |
|---|---|---|---|
| 3,082,165 A * | 3/1963 | Kroeper | C07C 5/322 585/602 |
| 2014/0014555 A1* | 1/2014 | Marri | C10G 11/187 208/78 |
| 2017/0087528 A1 | 3/2017 | Pretz et al. | |

FOREIGN PATENT DOCUMENTS

EP    2301658 A1    3/2011

OTHER PUBLICATIONS

First Examination Report in corresponding/related GC Application No. GC 2019-38694, dated Sep. 21, 2020.
(Continued)

*Primary Examiner* — Ellen M McAvoy
*Assistant Examiner* — Chantel L Graham
(74) *Attorney, Agent, or Firm* — Patent Portfolio Builders PLLC (57) ABSTRACT

A reaction unit for catalytic conversion of a hydrocarbon or hydrocarbon containing feedstock to a petrochemical mixture, includes a housing; a fluid bed distributor plate located at a bottom of the housing; a regeneration zone and a stripping zone located above the fluid bed distributor plate,
(Continued)

in which catalytic particles are housed; a reaction zone located above the stripping zone; and a condensation zone located above the reaction zone, in which a petrochemical product fluid is condensed.

28 Claims, 10 Drawing Sheets

(52) U.S. Cl.
CPC ............... *B01J 2208/00141* (2013.01); *B01J 2208/00902* (2013.01); *C10G 2300/202* (2013.01); *C10G 2300/205* (2013.01); *C10G 2300/308* (2013.01); *C10G 2300/4093* (2013.01)

(58) Field of Classification Search
CPC ............ C10G 2300/4093; C10G 11/00; C10G 2300/202; C10G 2300/205; C10G 2300/308

See application file for complete search history.

(56) References Cited

OTHER PUBLICATIONS

International Search Report in corresponding/related International Application No. PCT/IB2019/059144, dated Jan. 16, 2020.
Second Examination Report in corresponding/related GC Application No. GC 2019-38694, dated Dec. 23, 2020.
Written Opinion of the International Searching Authority in corresponding/related International Application No. PCT/IB2019/059144, dated Jan. 16, 2020.
First Examination Report in corresponding/related GC Application No. GC 2019-41439, dated Jul. 4, 2021.

* cited by examiner

ZONED FLUIDIZATION PROCESS FOR CATALYTIC CONVERSION OF HYDROCARBON FEEDSTOCKS TO PETROCHEMICALS

CROSS-REFERENCE TO RELATED APPLICATIONS

This application is a U.S. National Stage Application of International Application No. PCT/IB2019/059144, filed on Oct. 24, 2019, which claims priority to U.S. Provisional Patent Application No. 62/771,789, filed on Nov. 27, 2018, entitled "ZONED FLUIDIZATION PROCESS FOR CATALYTIC CONVERSION OF HYDROCARBON FEEDSTOCKS TO PETROCHEMICALS," the disclosures of which are incorporated herein by reference in their entirety.

BACKGROUND

Technical Field

Embodiments of the subject matter disclosed herein generally relate to a method and system for catalytic conversion of hydrocarbon feedstocks to petrochemicals, and more specifically, to a multizone fluidization process that achieves the catalytic conversion of the hydrocarbon feedstocks to petrochemicals in a single reactor unit.

Discussion of the Background

Converting hydrocarbon feedstocks like methane, shale gas, LPGs, hydrocarbons from biomass, alcohols and other oxygenates, naphtha (which is a flammable liquid hydrocarbon mixture) and/or lighter fractions, VGO (vacuum gas oil, i.e., heavy oils left over from petroleum distillation that can be further refined in a catalytic cracking unit), atmospheric residue, and crude oil into petrochemical products like C2-C4 olefins and aromatics is gaining more importance given the high demand for these base building blocks.

Figure 1:
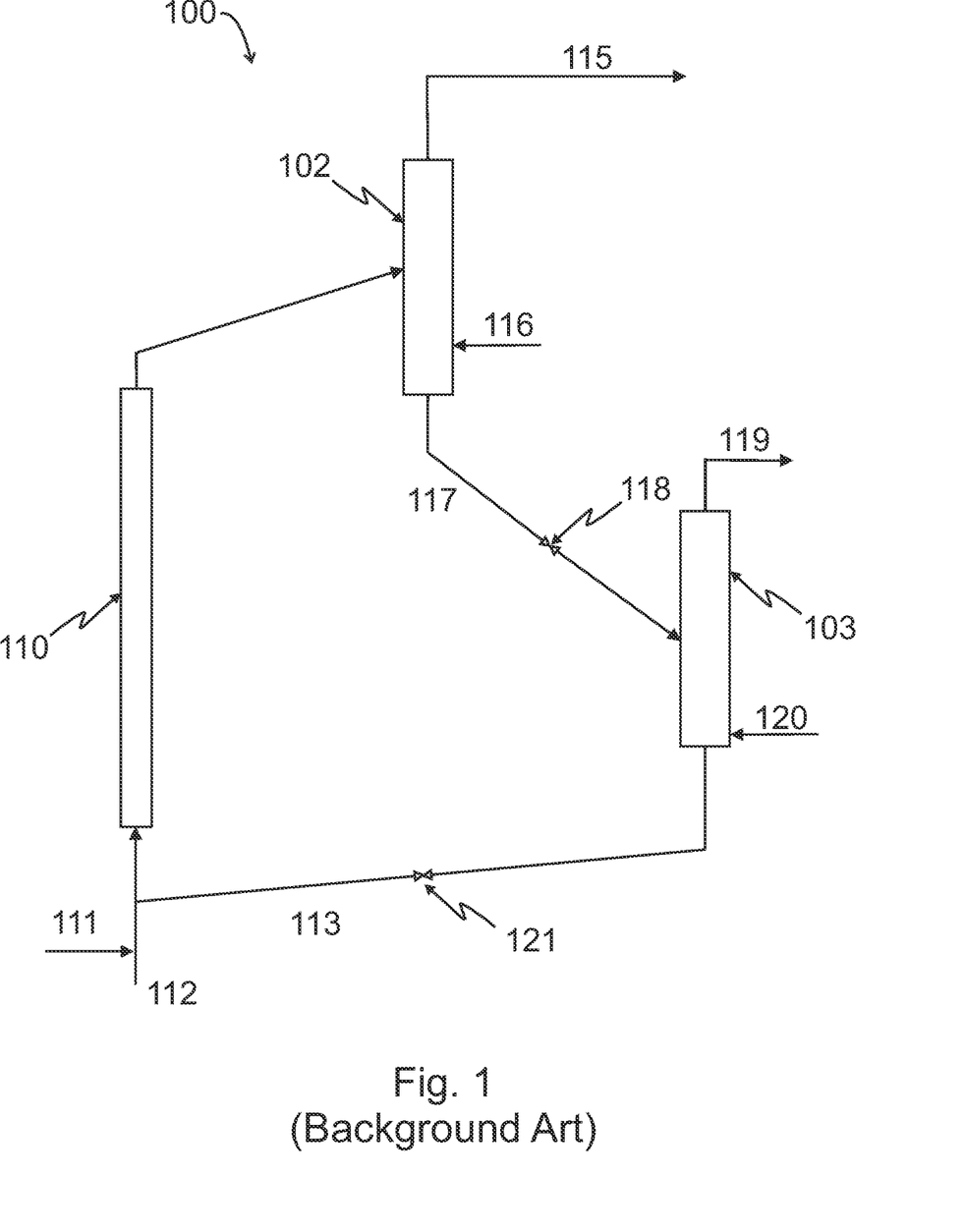
FIG. 1 illustrates a system that has a reaction module separated from a regeneration module.

Fluid catalytic cracking (FCC) is an important process that increases the yield of C2-C4 olefins and aromatics. The FCC process converts the high-boiling, high-molecular weight hydrocarbon fractions of petroleum crude oils into more valuable gasoline, olefinic gases, and other products. As illustrated in FIG. 1, which corresponds to FIG. 3 of U.S. Patent Application Publication 2009/0012339, a typical FCC system 100 includes a line 111 through which the feedstock is supplied. The feedstock enters into a line 112, which carries steam or gas, for dilution. The mixture enters then a riser 110, which is a reaction zone. A regenerated catalyst is also supplied to the riser 110 through a line 113. The steam or gas, when mixed with the feedstock, increases the selectivity of the light olefin hydrocarbons while making the flow of the regenerated catalyst efficient. The regenerated catalyst is supplied along line 113 from a regenerator 103, which is a separate entity from the riser 110. The temperature inside the regenerator 103 needs to be high to achieve the gasification of the feedstock.

The steam supplied by line 112 fluidizes the feedstock and catalyst, which are mixed at the bottom of the riser 110, and moves this mixture to the top of the riser while the mixture is subject to the cracking process. Because the cracking process is an endothermic process, the temperature of the mixture decreases, and thus, the temperature of the upper portion of the riser 110 is lowered. The products reaching the top of the riser 110 are then entering a stripper 102 that separates the gas products from the solid products. To increase the efficiency of the separation process, a cyclone may be used. The separated gas is removed along a line 115 and the separated catalyst is moved to the bottom of the stripper 102. Stripping steam is supplied along line 116 to the bottom portion of the stripper to remove the non-separated hydrocarbon reaction products. The catalyst is transferred along a line 117, under control of a valve 118, to the regenerator 103. In the regenerator, coke attached to the catalyst interacts with an oxidant supplied along line 120 so that the coke transforms into carbon monoxide or carbon dioxide, which is removed along line 119. The regenerated catalyst is supplied back to the riser 110 along line 113. Valve 121 controls the amount of regenerated catalyst that flows along the line 113.

During the FCC process described above, the cracking reaction is achieved in a riser or downer, where the catalyst and feedstock flow together in an entrained flow and are separated by using cyclones and strippers. The coked catalyst is regenerated in a separate vessel, which is operated at a higher temperature and residence time. One advantage of the system shown in FIG. 1 is that the residence time in the regeneration section 103 and in the catalytic cracking section 110 can be individually controlled. However, this advantage is at the cost of more complexity of the entire system, larger energy losses, and thus, relatively higher capital and operation expenditure. Another disadvantage is the large consumption of catalyst as a result of a high attrition due to the transference of solid between the two reaction vessels.

Moreover, it is becoming clear that higher temperatures and longer contact times are needed in the reactor part to achieve higher olefin yields. High temperatures are more difficult to achieve when the regenerator (which is the source of heat) and the reactor modules are kept physically separated in different vessels as shown in FIG. 1. Risers and downers are also limited in length and thus, the maximum contact time is 2-5 s for a typical FCC riser and 0.5-1 s for a high-severity FCC (HSFCC) system.

Therefore, there is a need for a new method and FCC system that is not being affected by the above discussed shortcomings.

SUMMARY

According to an embodiment, there is a reaction unit for catalytic conversion of a hydrocarbon or hydrocarbon containing feedstock to a petrochemical mixture. The reaction unit includes a housing, a fluid bed distributor plate located at a bottom of the housing, a regeneration zone and a stripping zone located above the fluid bed distributor plate, in which catalytic particles are housed, a reaction zone located above the stripping zone, and a condensation zone located above the reaction zone, in which a petrochemical product fluid is condensed.

According to still another embodiment, there is a method for catalytic conversion of a hydrocarbon feedstock or a hydrocarbon containing feedstocks to a petrochemical fluid. The method includes supplying the hydrocarbon or hydrocarbon containing feedstock to a reaction zone, located in a single reaction unit, supplying a fluidization gas to the reaction zone through a regeneration zone and a stripping zone, also located in the single reaction unit, converting the hydrocarbon feedstock into the petrochemical fluid, in the reaction zone, in the presence of catalytic particles, and condensing the petrochemical fluid in a condensation zone, also located in the single reaction unit. The reaction zone is sandwiched between the condensation zone and the regeneration and stripping zones.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a reaction unit that has multiple zones located in a same vessel for achieving fluid catalytic cracking. However, the embodiments discussed herein are not limited to cracking reactions.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a method for catalytic cracking where the regeneration process, stripping of adsorbed compounds on the catalyst, and the catalytic cracking process are performed in one fluidized vessel, together with a condensation process, which allows more extensive cracking of heavier components and better heat integration. The combination of all these processes into a single fluidized vessel allows for longer contact times between the feedstock and the catalyst and the establishment of an optimal heat transfer between the regeneration zone and the reaction zone of the single fluidized vessel, making the achievement of higher temperatures easier than the known reactors. Moreover, it was found that the configuration of this embodiment delays significantly the deactivation of the catalyst due to the formation of coke, as the stripping of the absorbed compounds before going into the regeneration zone is much more effective. As the entire cracking process becomes a one-unit operation, both the capital and operation expenditure are expected to decrease.

Figure 2:
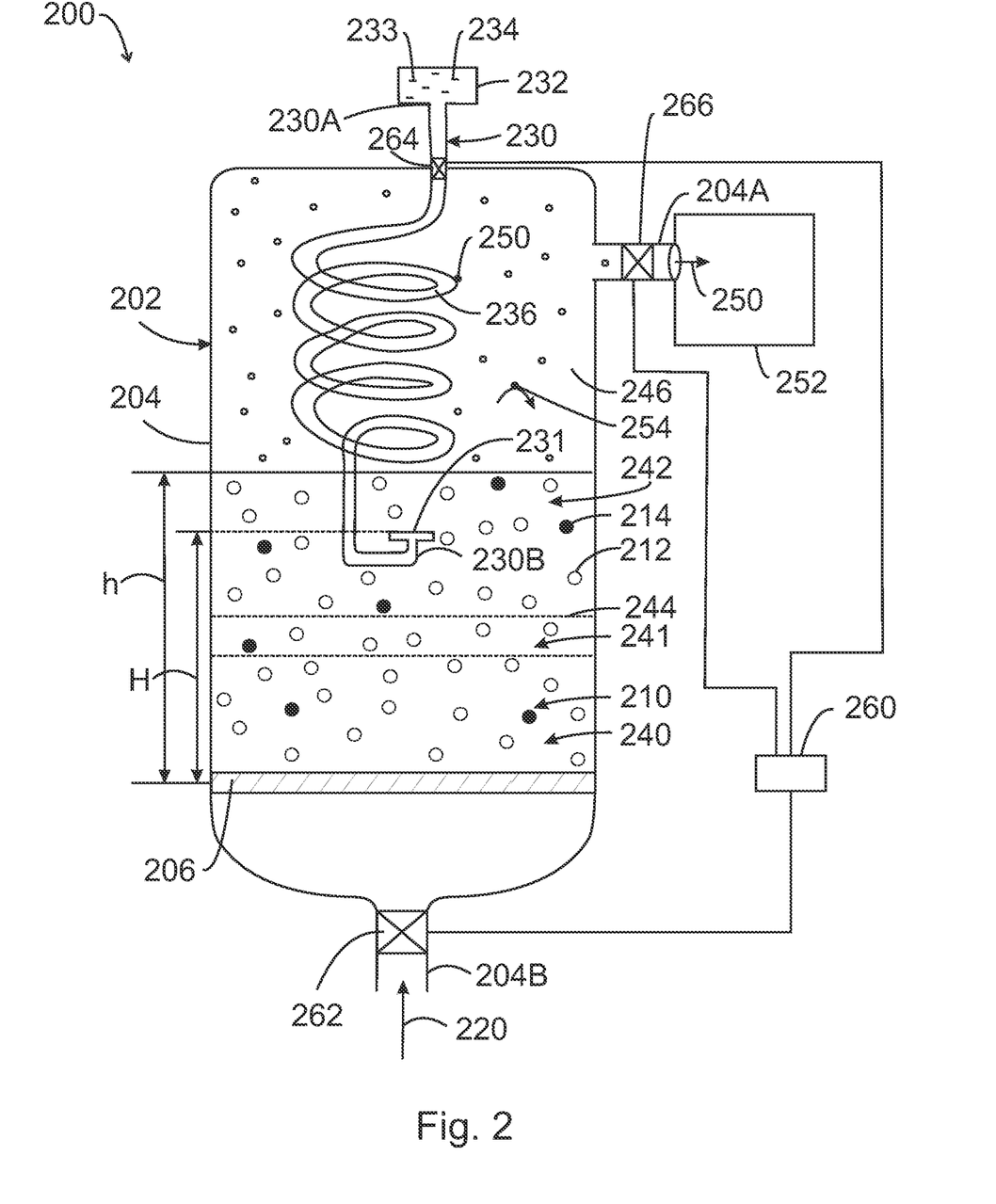
FIG. 2 illustrates a catalytic system having a reaction zone, a regeneration zone and a condensation zone located in a single unit.

A novel FCC system 200 is now discussed with regard to FIG. 2. The FCC system 200 includes a reactor/stripping/regenerator/condensation unit 202 (simply called herein the reaction unit) in which several reactions (to be discussed later) take place. The reaction unit 202 has a housing 204 that hosts the various zones. In one application, the housing 204 is a single housing that hosts all the zoned to be discussed herein. At the bottom of the housing 204, there is a perforated (or porous) base plate 206 (also called a fluid bed distributor plate) that is configured to support a catalytic bed 210. The catalytic bed 210 originally includes catalyst particles 214 and no coke 212. For example, the catalyst 214 may be zeolite. In one application, the catalyst includes one or more cracking catalysts. The particles of the catalyst 214 may have a size distribution between 20 and 120 microns. In one embodiment, the catalyst particles are placed into the feed and supplied into the reaction unit 202 from the feed. In other words, the catalyst particles are either present in the unit or they are supplied with the feed or supplied separately from make-up tank containing fresh catalysts. After the reaction unit 202 is used for a certain time, coke 212 forms on the catalytic particles 214 and on the walls of the housing 204. The coke 212 is a fuel rich in carbon.

A fluidization gas 220 is provided at a bottom port 204B of the housing 204. The fluidization gas 220 may include water, or nitrogen, or a mixture of water and nitrogen, or other chemical elements that help to remove the coke, as discussed later. The fluidization gas 220 propagates through the porous base plate 206 and enters into the catalytic bed 210. Depending on the speed of the fluidization gas 220, the particles of coke and catalyst start moving around like into a fluid that is agitated, from which the name of the fluidization gas.

The housing 204 has also a top port 204A through which a product of the FCC process is removed from the reaction unit 202, as discussed later. A feeding pipe 230 enters at the top part of the housing 204, and extends into the catalytic bed 210. One end 230A of the feeding pipe 230 is connected to a device 232 that is mixing the feedstock 233 with liquid water 234 (if water is present, however, it is possible to introduce the feedstock with no water), and the other end 230B of the feeding pipe is placed inside the catalytic bed 210, i.e., in direct contact with the coke 212 and catalyst 214. The second end 230B of the feeding pipe may terminate with a spray nozzle 231. In one application, the height H of the second end 230B of the feeding pipe 230 relative to the base plate 206 is set to be smaller than the height h of the catalytic bed.

The catalytic bed 210 includes in the lower part not only the coke 212 and the catalyst 214, but also the inert fluidization gas and regeneration (reactive) gas 220. The inert fluidization gas cannot react with hydrocarbons or coke and remains chemically unchanged, but it may enhance desorption of strongly adsorbed hydrocarbons from the catalyst surface. The regeneration gas can react with coke and hydrocarbon and form gaseous products like CO and $CO_2$. This lower part is called herein the regeneration and stripping zone 240 for reasons to be discussed later. Preferably, the middle part of the catalytic bed 210 does not include any oxidating (regeneration) gas 220, but only the coke 212, inert fluidization gas and the catalyst 214, and this part is called the reaction zone 242. The molecules of the feedstock are added to the reaction zone. By being able to control a height H of the second end 230B of the feeding pipe 230 in the housing 204 (it should be high enough in the reaction zone 242), it is possible to control the volume of the stripping zone 241, which is located, as illustrated in FIG. 2, between the regeneration zone 240 and the reaction zone 242. Although FIG. 2 shows a narrow border 244 between the regeneration/stripping zone 241 and the reaction zone 242, one skilled in the art would understand that these border zones are not simple planes, but rather a volume in which the particles of the regeneration (reactive) gas 220 slowly disappear keeping only the inert fluidization gas and catalyst particles or feedstock molecules slowly disappears in product or unreactive adsorbed species. Further, a location of the border 244 relative to the base plate 206 depends on the height H of the second end 230B of the feeding pipe 230. In the regeneration zone 240, anything that did not desorb from the catalyst reacts when in contact with the regeneration (oxidizing) gas 220. A stripping zone 241 can be defined as a region of the reactor, usually located below the reaction zone 242 and above the regeneration zone 240, where the catalyst containing adsorbed non-reacted heavy hydrocarbons undergoes stripping under the action of an upwards flowing of inert fluidization gas to desorb these potentially "poisonous" molecules.

The reaction unit 202 described in FIG. 2 further includes a condensation zone 246, which, in one embodiment, extends from a top of the catalytic bed 210 to a top of the housing 204. The condensation zone 246 ideally does not include particles of coke or catalyst, although in practice, these particles find their way into the condensation zone. However, if the velocities in the condensation zone are reduced by increasing the reactor diameter, it is possible to dramatically reduce their presence in the condensation zone. In this zone, by controlling the temperature, only gases 250 that result from the FCC process travel from the catalytic bed to the top port 204A and are collected into a container 252. These gases, also called the reaction products, contain the desired petrochemicals. The reaction products in the condensation zone 246 preheats the cold feed inside the pipe and consequently, the heavier portions of the reaction product condenses and falls back to the reaction zone 242.

Figure 3:
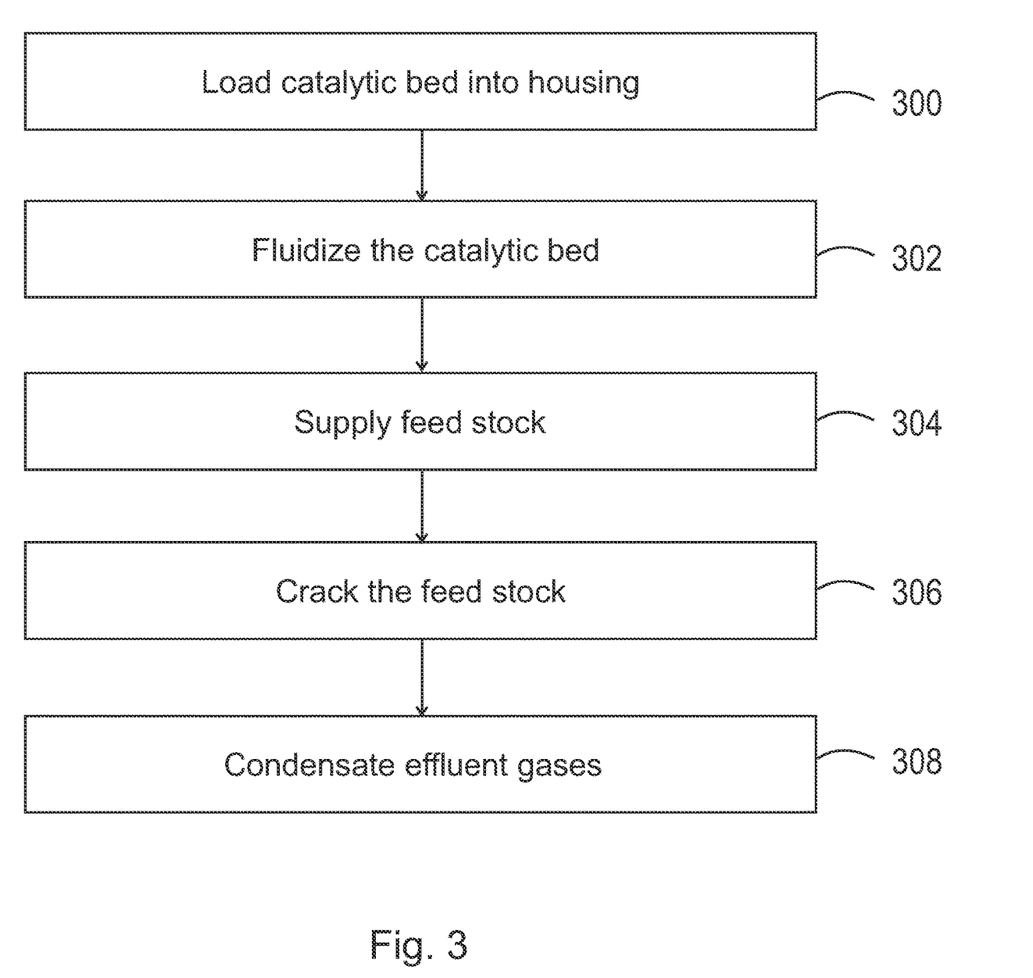
FIG. 3 illustrates a method for cracking a hydrocarbon feedstock into a petrochemical fluid using the system of FIG. 2.

The FCC process that takes place inside the reaction unit 202 is now discussed with regard to FIG. 3. FIG. 3 is a flowchart of an FCC method. The method starts in step 300 with loading the catalytic bed 210 into the housing 204. As previously discussed, the catalytic bed 210 originally includes only the catalyst 214. The coke 212 forms during the cracking process on the catalyst particles. Part of the coke, called coke precursors, will be removed in the stripping zone 241 using the fluidization gas containing inert gases such as steam/Nitrogen. Coke precursors are defined as hydrocarbons adsorbed on the catalyst that can be desorbed at high temperatures in the presence of vacuum or a stripping inert gas. Hard coke will be removed in the presence of oxidizing fluidization gases. Hard coke is defined as those deposits that cannot be removed by stripping at temperatures in the range 25 to 800° C. The catalyst is formulated in a way that the selectivity for C2-C4 olefins is maximized to at least 20%, but preferably 50% or higher of the total hydrocarbon feedstock. Those skilled in the art would understand that these numbers are exemplary and other values may be used. The BTX selectivity (where the term BTX stands for the mixtures of benzene, toluene, and the three xylene isomers, all of which are aromatic hydrocarbons) of the catalyst should be at least 1% and preferably up to 25%. The used catalyst may contain additional functionalities apart from cracking (i.e., desulfurization, demetallation, aromatization, dealkylation, alkylation and/or denitrogenation).

Catalyst powders should have Geldart classification A (aeratable) or B (sand-like), with ideally particle sizes ranging from 10 to 200 micrometer, and skeletal densities ranging from 0.5 and 3 kg/m3.

Besides the increased selectivity of the desired products, an additional advantage of using an optimized catalyst in the process is that the coke will mainly be absorbed on the catalyst and will not be flashed out from the housing 204 as soot by the fluidization gases 220. This is in contrast with the BASF process, that was developed in the 60's, were 50% of the coke disappears as sooth and it needs to be recycled to allow for heat balance (see, for example, U.S. Pat. No. 3,082,165).

In the '165 patent, it is mentioned that excess petroleum coke is also one of the product streams. As the petroleum coke is clearly described as the source for heat, it is assumed that the release of excess petroleum coke is a parameter in heat management. The system 200 does not release or releases a minimal amount of excess petroleum coke as a product stream. While the BASF process is described as generating excess petroleum coke of around 5 wt % on feedstock basis, the system 200 only releases max 1 wt %, preferably lower 0.5 wt %. To overcome the problem of heat management without the need of producing excess petroleum coke, together with fluidization gas, $CH_4$ or other low value hydrocarbons gases, like off-spec gases normally flared can be co-fed to the regeneration zone and burnt to provide additional heat.

Still with regard to step 300, in case of overheating of the catalytic bed, extra water or less $O_2$ is fed to the reactor for reducing the temperature. Alternatively, as will be discussed with regard to other embodiments, it is possible to send more feedstock through the regeneration zone 240 and the stripping zone 241. In one application, the catalyst can be formulated together with heat generating materials (see for example, international patent publication WO 2017/196660) to minimize the need of sacrificing feedstock to be burn as coke for heat generation.

In step 302, the catalytic bed 210 is fluidized by pumping the fluidization gas 220 through the base plate. The fluidization of the catalytic bed can be performed with a gas that contains oxidizing chemicals like $O_2$. However, two or more oxidants can also be mixed together. For example, $O_2$ can be mixed with other oxidants, like $CO_2$. The oxidants or mixture of oxidants should be able to convert the coke to $CO_2$ or CO and generate sufficient heat to keep the bed's temperature at a high desired value. Typical example might be $O_2$ in $N_2$ gas mixture (air or air diluted with $N_2$, $H_2O$, $CO_2$, flue gas, CO or oxygen diluted in $H_2O$, $CO_2$ or flue gas).

The main parameters which control the efficiency of the process of generating the petrochemicals are the concentration of the oxidant and the way the oxidant is applied. In one application, the concentration of the oxidant is selected to be in a range from 1 to 20 vol %. The concentration of the oxidant is selected depending on the amount of hard coke to be burnt, but also on the fact that nowhere inside the reactor an explosive composition should emerge. This concentration is optimized together with the contact time in the regeneration and stripping zone. Besides, the oxidant can be supplied either in a continuous mode or in a periodic pulses. The in-situ regeneration process of the catalyst using periodic pulses conditions is shown to be the most efficient.

In step 304, the feedstock 233 is supplied through the coil pipe 230 into the reaction unit 202. As discussed with regard to FIG. 1, steam is typically used as a reagent and heat transfer agent, but also plays a role in minimizing coke deposits on reactor walls and pipes as well as increasing selectivity to light olefins. In the system of FIG. 1, the water is added to the feed/reactor directly in the form of steam, generated somewhere else in the plant. In the system of FIG. 2, different from the system of FIG. 1, the feedstock 233 may be contacted with the water 234 in liquid from (not steam) and emulsified in the emulsifying device 232 (high shearing mixing device using, for example, ultrasound) to obtain well-dispersed oil droplets inside a continuous water phase. The temperature of the emulsion 236 can be in the range of 20° C. to the reaction's temperature while the pressure of the emulsion can be up to hundreds of bars. The pressure is needed to keep the water in the liquid phase in the coil pipe 230. This emulsion 236 flows through the coil pipe 230 through the condensation zone 246, where it is evaporated by contact with the hot reaction products 250 and/or by sending it through the regeneration zone 240 and the stripping zone 241 of the vessel, as discussed later with regard to another embodiment.

This approach helps with the heat management process. The evaporation of the water 234 inside the feeding pipe 230, when leading the feed emulsion 236 through the condensation zone 246, will take additional heat from the product 250, resulting in more heat recovery and more condensation of heavies (heavy products that do not evaporate and do not leave the housing through the top port 204A) in this condensation zone of the housing.

Besides advantages in the heat management process, feeding this emulsion 236 with fine droplets of feedstock results in a very well distributed contact of the feedstock 233 with the catalyst particles 214 and thus, a more efficient use of the reaction unit 202. The distribution of the emulsion 236 over the catalyst particles 214 can be improved by using spray nozzles 231 or similar devices that generate a high amount of small emulsion droplets inside the catalytic bed 210. As discussed above, it is also possible to include the catalyst/makeup catalyst particles 214 into the emulsifying device 232, so that the catalysts particles are already mixed with the feedstock 233 when entering the reaction zone 242.

Having water 234 as the continuous phase in the feeding emulsion 236 further minimizes the loss of feedstock 233 in coke deposits on walls and lines of the system 200. Indeed, the present approach avoids direct contact between the hydrocarbon feed 233 and the walls 204. As the water 234 evaporation will take a lot of heat, overheating of the feedstock 233 before it enters the catalytic bed 210 is also prevented. Uncontrolled heating together with undesired thermal reactions are a source for coke deposits on walls and pipes in the traditional systems.

A ratio of the water 234 to the heavy hydrocarbon feedstock 233 is a controllable parameter that is ranging in this embodiment between 0.001 and 3 by weight. In one embodiment, water may be omitted. The water may be replaced by other energy enriched oxygenates such as methanol, aldehydes, ketones. Preferably, these oxygenates come from bio sources. Besides all of the benefits discussed above, these oxygenates, when cracked, add additional heat to fuel the hydrocarbon cracking and increase the yield of light olefins.

Depending on where the feedstock emulsion 236 and the oxidizing gas 220 are injected into the catalytic bed 210, and the amount of coke 212 produced on the catalyst, a part of the fluidized bed is oxidant free. This part, as previously discussed, corresponds to the reaction zone 242, where the main part of the cracking and dehydrogenation reactions occur in step 306. The remaining part has still oxidizing gas present and thus, it allows burning of the coke 212 and generating heat to fuel the hydrocarbon cracking processes. This zone corresponds to the regeneration zone 240 and the stripping zone 241, as also discussed above.

There may be a gradient zone where both type of reactions are occurring and this zone corresponds to the border zone 244. An important parameter of the reactor unit is the volumetric ratio between the regeneration/stripping zone, the reaction zone, and the condensation zone. The ratio between the regeneration/stripping and reaction zones can range from 1 to 20, preferably 5-15, and most preferably should be around 10. This volumetric ratio is determined by the total height of the catalytic bed, the diameter of the vessel (housing) and the inlet's height of the feedstock. The inventors surprisingly found that a significant volume for the stripping zone can significantly delay catalyst deactivation.

The size (e.g., volume) of the condensation zone can be changed depending upon the condensation temperature and the type of feedstock to be treated.

In step 308, the effluent gases obtained from the FCC process are released into the condensation zone 246 for being condensed. The inventors have realized the advantage of having a condensation zone 246 directly above the fluidized bed 210 and in the same housing 204. The condensation is allowed to occur before the effluent gases 250 leave the reaction unit's housing 204. In this way, heavies 254 that are not completely converted/cracked are condensed and drop back to the catalytic bed 210, where they are re-cracked to more desired products. If not further cracked down, these condensed heavies 254 are a potential source for coke formation, which is partially needed for the heat generation process. This novel approach reduces or completely eliminates the need of external recycling streams and further downsizes the effluent purification units, downstream the reaction unit 202. Recycling of heavies is needed for increasing yield of desired products 250, but also for sufficient production of coke 212. The condensation zone 246 allows also efficient heat management. In one application, the condensed liquid may also reduce the coke soot that leave the reaction unit 202.

Regarding the temperature control and heat management for the FCC process within the reaction unit 200, a controller 260 and associated valves 262, 264, and 266 are employed to control the heat distribution. FIG. 2 shows fluidization valve 262, which controls the amount of fluidization gas 220 entering the housing 204. The feedstock valve 264 controls the amount of feedstock emulsion 236 that flows along the coil pipe 230 and effluent gas valve 266 controls the amount of effluent gas 250 that exits the housing 204. The controller 260 can independently control each of these valves as now discussed.

The temperature of the catalytic bed 210 ranges from 400-1000° C., preferably 500-850° C. The controller 260 has several ways to control the heat generated from the burning of the coke, and thus, the inside temperature of the housing. One of the main factors is the amount of carbon that is burned in the regeneration zone, which is measured by the yield of CO and $CO_2$ in the effluent gases, and which will be the main source for the heat required in the cracking process. The carbon to be combusted can be from heavy hydrocarbons, like asphaltenes, polyaromatics, etc. that are adsorbed onto the catalyst and are not cracked, or coke generated during the cracking process. In one application, the controller is programmed to minimize the use of hydrocarbon feedstock for heat generation. This use should be lower than 25 wt % of the feedstock, preferably even lower than 20 wt %, and ideally around 15 wt % or less. For instance, if the controller controls the reaction unit 202 to preheat the oil to 280° C. and the feedstock is cracked at 720° C., then 1100 kcal/kg feed is needed to reach these temperatures. It is estimated, based on literature data that around 150 g carbon per kg feedstock needs to be burned with oxygen to generate this heat. The chemical reaction is $C+O2 \rightarrow CO2$, with $\Delta H=-91$ kcal/mol.

The controller may also be programmed to control other parameters for heat management. For example, the feedstock 233 and the oxidizing gas 220 may be preheated by leading them partially though the regeneration zone 240 and the stripping zone 241 or contacting them with the effluent gas 250 in the condensation zone 246 as illustrated in FIG. 2.

Alternatively, it is possible to lead the feedstock or oxidizing gas through a zone above the fluidized bed, where heavy parts are allowed to condense again by contact with the colder stream, thus recovering heat to preheat these streams. The condensed heavies 254 will drop back to the bed 210, where they can be further cracked.

In one application, it is possible to add heat generating materials (see WO 2017/196660) to the catalytic bed and/or the feedstock together with hydrocarbons. In still another application, it is possible to control the ratio of $H_2O$ and hydrocarbon feedstock in the device 232. In another embodiment, it is possible to control the amount of carbon that is combusted and thus, the heat that is generated. This is achieved, for example, by controlling the Conradson Carbon Residue of hydrocarbon feedstock. This is a property of the feedstock, but can be influenced by blending different feedstocks. The higher this value, the more carbon residue will be available for combustion. Another mechanism for controlling the amount of combusted carbon is by controlling the volumetric ratio between the regeneration zone and the reaction zone. Still another mechanism for controlling the amount of combusted carbon is by controlling the residence time of the feedstock in the regeneration and condensation zones. Yet another mechanism is controlling the ratio between the feedstock and the oxidizing gas. A partial combustion in lean conditions can be targeted, producing mainly CO but also less heat. If heat generation from the burnt coke is not enough to allow for the cracking step, additional low value hydrocarbon gases can be co-fed to regeneration zone. A last way of heat management is the introduction of hydrocarbon-based gases into the fluidization gas for additional heat generation through combustion.

Figure 4:
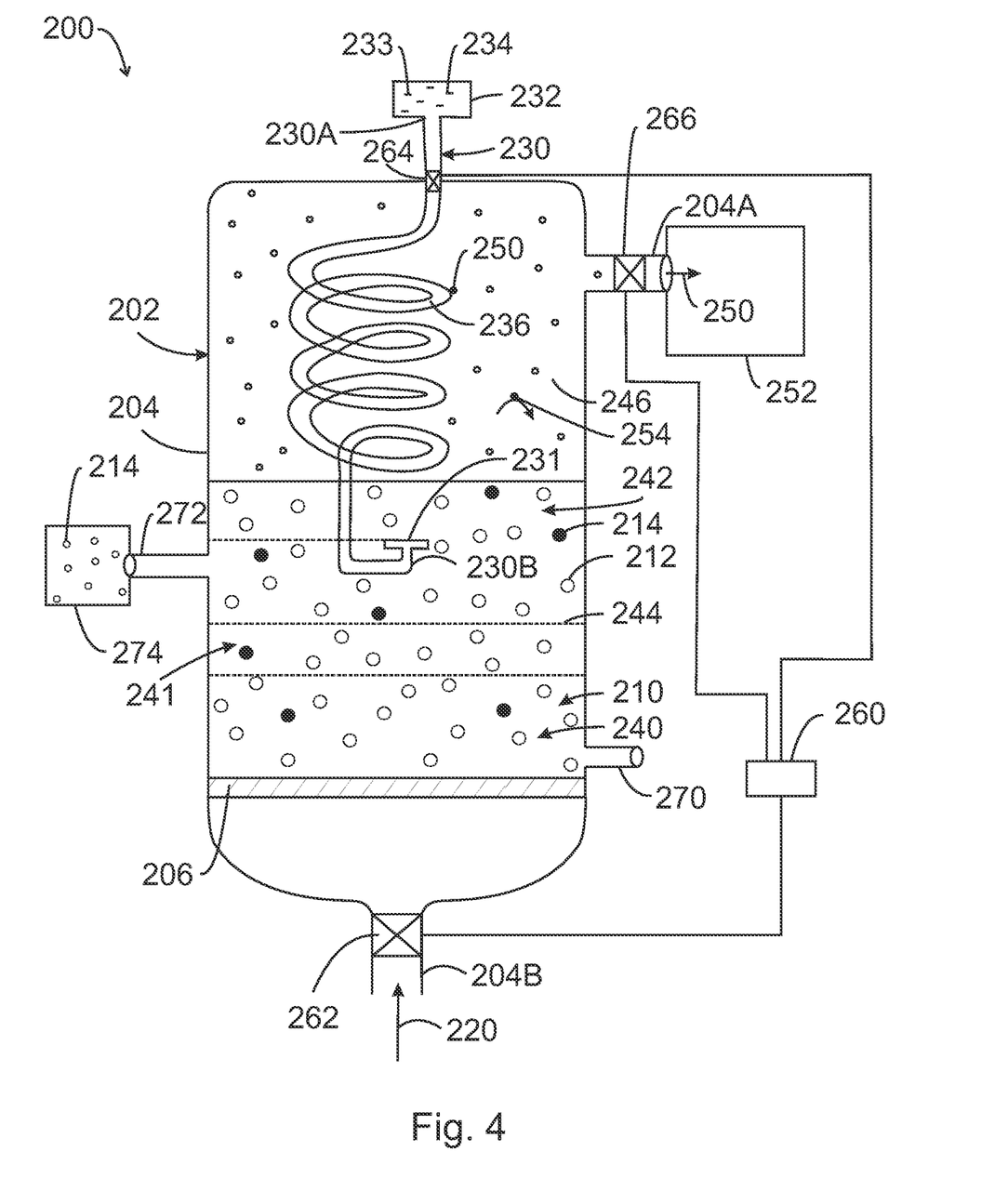
FIG. 4 illustrates another catalytic system having a reaction zone, a stripping and regeneration zone and a condensation zone located in a single unit with a system to facilitate discharge and make-up of spent and fresh catalyst.

According to another embodiment, illustrated in FIG. 4, a bleed catalyst outlet 270 is provided at the bottom part of the housing 204, so that a certain amount of the catalytic bed 210 may be removed. In this regard, the inventors have noted that the catalyst particles 214 capture most metals and other poisons in the catalytic bed, and these catalyst particles having metals and other poisons are concentrated at the bottom part of the housing 204 as these particles have a higher density. Thus, these particles of spent catalysts having the metals and/or poisons can be removed from the housing 204. For this reason, catalyst outlet 270 is used to selectively remove the bottom catalyst particles that are loaded with the metals and/or poisons. A catalyst inlet 272 is also added to the housing 204, toward the top of the catalytic bed 210, so that new catalytic particles are added to the catalytic bed during the FCC process without stopping the process. This is necessary for maintaining the amount of catalyst particles 214 substantially constant during the FCC process. Note that in one application, catalyst particles 214 are added from a supply catalyst particle container 274 on a continuous or intermittent basis. This means that according to a first application, the catalyst particles 214 from the catalyst particle container 274 are continuously poured through the catalyst inlet 272 into the housing 204 of the reaction unit 202 while a same amount of spent catalyst particles 214 laced with metals and/or other poisons are removed at the catalyst outlet 270. According to a second application, this process of adding fresh catalyst particles 210 at inlet 272 and removing dirty catalyst particles at outlet 270 is intermittent, i.e., during a time interval T1 every n minutes, where T1 can be in the minutes or hours and n has a value between tens and thousands. If needed, this system can also be used to perform (part of) the regeneration outside the vessel. Although FIG. 4 shows the inlet 272 connected directly to the reaction zone 242, it is also possible to place the inlet 272 to directly connect with the stripping zone 241 or the regeneration zone 240.

Figure 5:
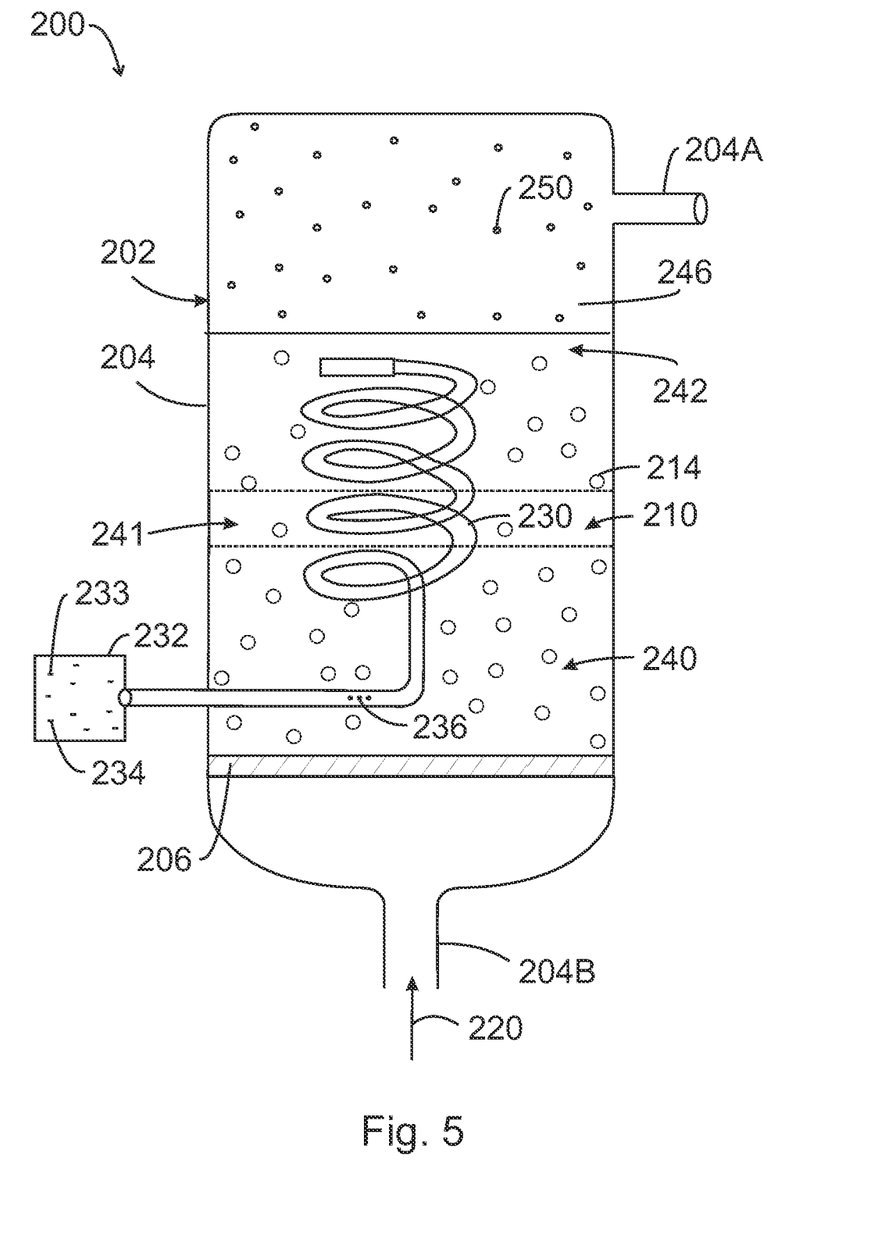
FIG. 5 illustrates yet another catalytic system having a reaction zone, a regeneration zone and a condensation zone located in a single unit.

In another embodiment illustrated in FIG. 5, the coil pipe 230 does not enter through the top part of the housing 204 and does not extend through the condensation zone 246, as in the embodiment of FIG. 2. Instead, in this embodiment, the coil pipe 230 enters at the bottom of the housing 204, next to the base plate 206, and extends upward through the regeneration zone 240 and the stripping zone 241 and partially into the reaction zone 242. An advantage of this embodiment is that the feedstock 233 and the oxidizing gas 220 are preheated by leading them partially though the regeneration and stripping zones. This also prevents the overheating of the regeneration and stripping zones, as the emulsion 236 (formed from feedstock 233 and water 234) directly absorbs the excess heat from the catalytic bed 210.

Figure 6:
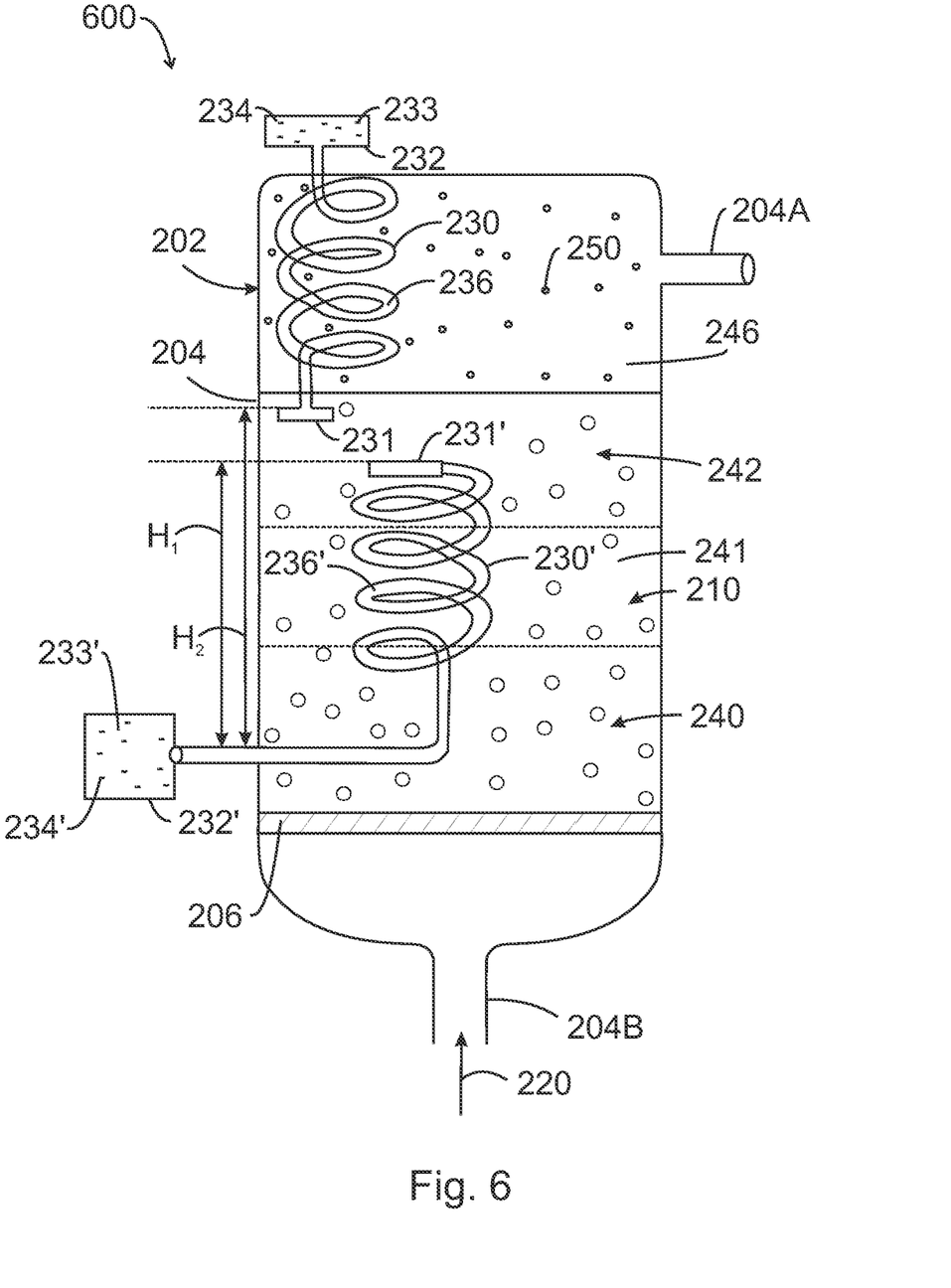
FIG. 6 illustrates a catalytic system having a reaction zone, a regeneration zone, a stripping zone and a condensation zone located in a single unit and also having two supply pipes for supplying the feedstock.

Another embodiment is illustrated in FIG. 6. In this embodiment, the reaction unit 600 has the feedstock 233 supplied to the catalytic bed 210 from two different pipes 230 and 230'. A first pipe 230 is similar to the embodiment of FIG. 2 and the second coil pipe 230' is similar to the embodiment of FIG. 5. This means that the first pipe 230 enters into the condensation zone 246 and then extends into the reaction zone 242 while the second pipe 230' enters first into the regeneration and stripping zones and then extends into the reaction zone 242. Thus, the hydrocarbon feed/water emulsions 236 and 236' are sent through both the condensation zone 246 and the regeneration/stripping zones 240/241. This configuration will give more degrees of freedom in terms of heat management. Higher feed rate from the top side through the condensation zone is needed to recover as much heat as possible from the effluent gases. Higher feed rate from the second pipe 230' is needed when the regeneration zone overheats. Thus, a flow of the emulsion 236 can be controlled independent of the flow of the emulsion 236'. Further, according to this embodiment, it is possible to place the ends of the first and second pipes 230 and 230' at the same height or different heights H1 and H2, as shown in the figure.

Figure 7:
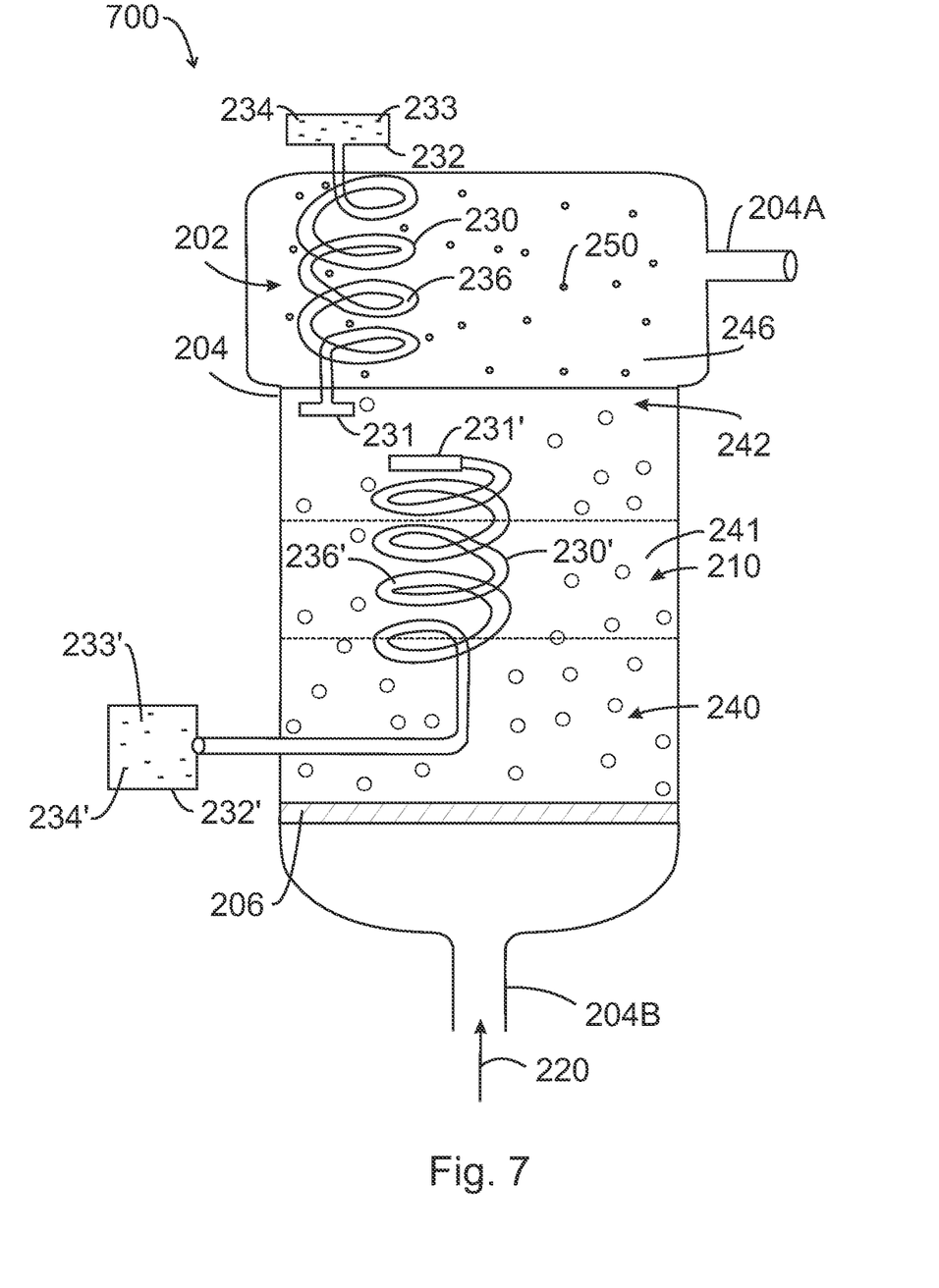
FIG. 7 illustrates a catalytic system having a reaction zone, a regeneration zone and a condensation zone located in a single unit, and the condensation zone is larger than the reaction zone.

Still another embodiment is illustrated in FIG. 7. The FCC system 700 has a reaction unit 702 that is similar to that of FIG. 6, except that a diameter of the condensation zone 246 is larger than a diameter of the reaction zone 242. This increased in size (or volume) lowers the velocity of the effluent gasses, thus allowing a longer contact of the effluent gasses with the feed lines, which results in more heat transfer. Also, fine products that are dragged from the catalytic bed by the fluidization gas and unevaporated liquids drop back to the catalytic bed. This increased diameter (or volume) of the condensation zone 246 can also be used in the embodiment of FIG. 2, where the feed emulsion 236 is only led through the condensation zone 246.

Figure 8:
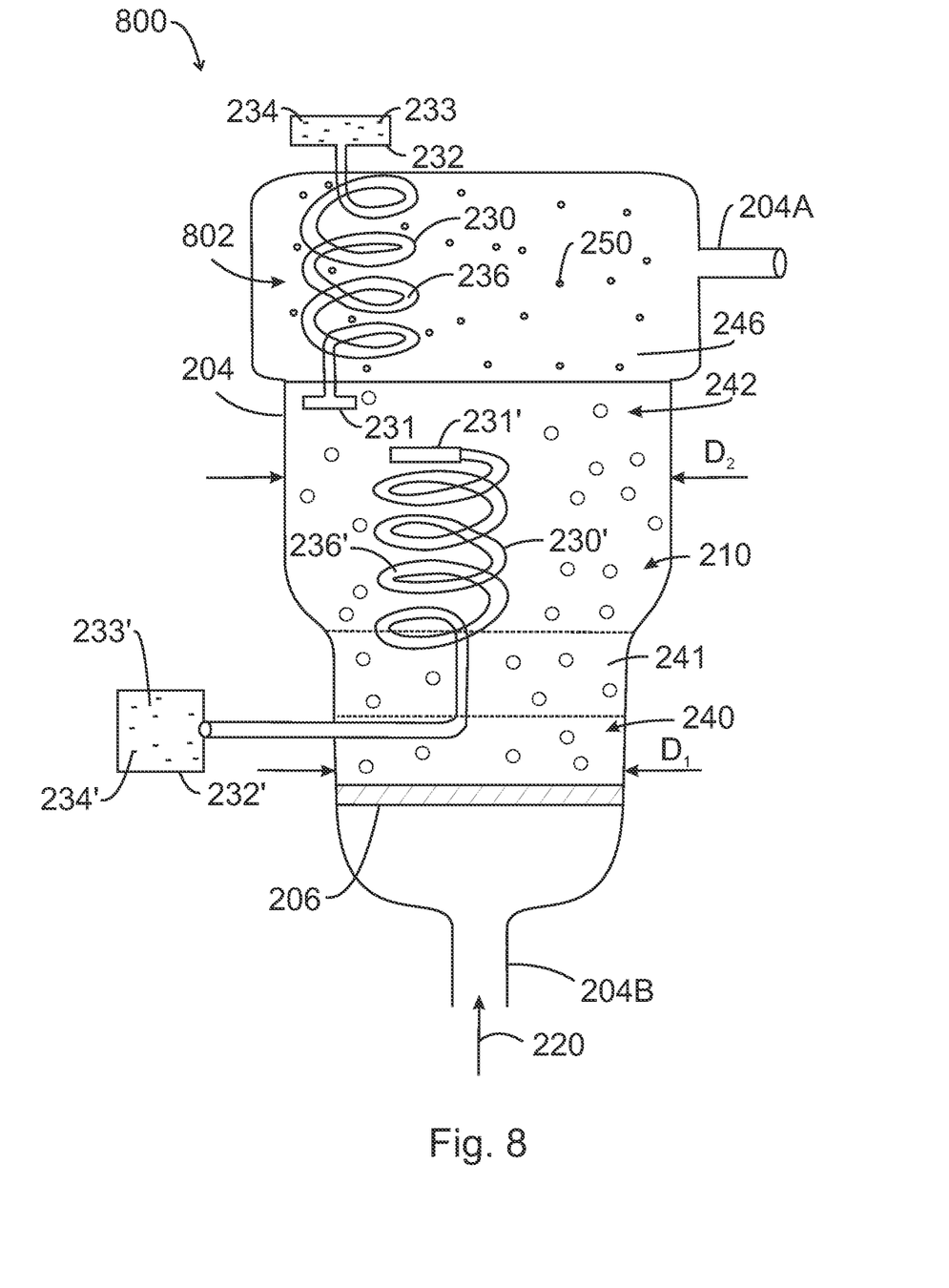
FIG. 8 illustrates a catalytic system having a reaction zone, a regeneration zone and a condensation zone located in a single unit and each of the zones is different in volume than the others.

Another embodiment is illustrated in FIG. 8. The FCC system 800 in this embodiment has a reaction unit 802 in which the regeneration and stripping zones have a size D1 (in this case a diameter) smaller than a size D2 of the reaction zone 242. Except this feature, the reaction unit 802 is similar to the reaction unit 702 and thus, the other elements of the unit are not described herein. One skilled in the art would understand that this feature of having the diameter or width or volume of the reaction zone larger than the corresponding size or width or volume of the regeneration/stripping zones is also applicable to the embodiments illustrated in FIGS. 2 and 4-7.

Figure 9:
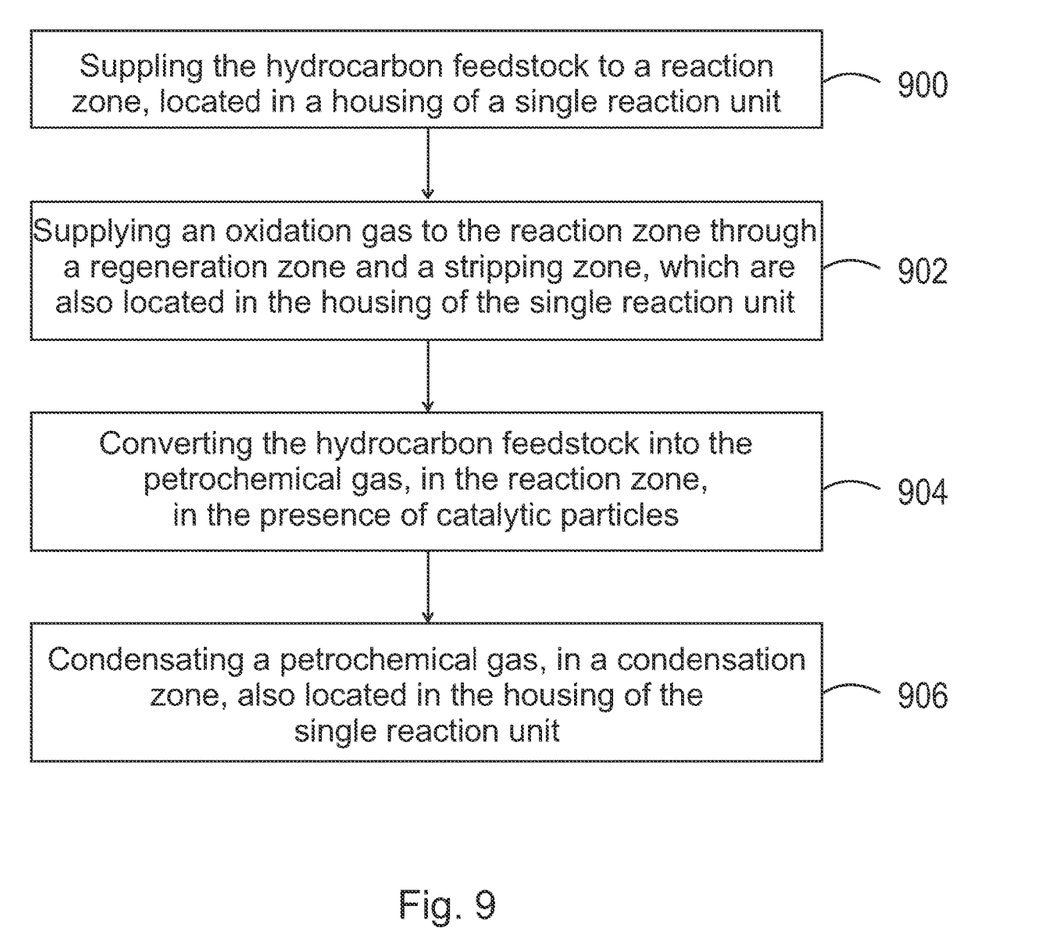
FIG. 9 is a flow chart of a method for converting the feedstock into a petrochemical product with any of the systems noted above.

An advantage of the reaction units discussed above is their capability to crack not only the typical feedstocks, but also crude oil, as now discussed with regard to the method illustrated in FIG. 9. The method for catalytic conversion of a hydrocarbon feedstock to a petrochemical fluid (which may be a gas or liquid) includes a step 900 of supplying the hydrocarbon feedstock 236 to a reaction zone 242, located in a housing 204 of a single reaction unit 202, a step 902 of supplying a fluidization gas 220 to the reaction zone 242 through regeneration/stripping zones 240/241, also located in the housing 204 of the single reaction unit 202, a step 904 of converting the hydrocarbon feedstock 236 into the petrochemical fluid 250, in the reaction zone 242, in the presence of catalytic particles 214, and a step 906 of condensating the petrochemical fluid 250, in a condensation zone 246, also located in the housing 204 of the single reaction unit 202. The reaction zone 242 is sandwiched between the condensation zone 246 and the regeneration/stripping zones 240/241.

In the method, the hydrocarbon feedstock is supplied along one or more feeding pipes to the reaction zone. In one application, the fluidization gas is supplied at a bottom port 204B, located at a bottom of the housing, to the regeneration/stripping zones. The petrochemical fluid passes from the reaction zone into the condensation zone. The method may also include a step of heating up the hydrocarbon feedstock inside the pipe with the petrochemical fluid in the condensation zone. In one embodiment, the pipe extends through the condensation zone and the reaction zone. In another embodiment, the pipe extends through the regeneration zone and the reaction zone. In still another embodiment, the feeding pipe includes (1) a first pipe that extends through the condensation zone and the reaction zone, and (2) a second pipe that extends through the regeneration zone and the reaction zone.

In one application, a volume of the condensation zone is larger than a volume of the reaction zone. In yet another application, a volume of the reaction zone is larger than a volume of the regeneration/stripping zones.

Several experiments in which Arabian Light was cracked in a quartz four zones reactor (discussed above and having an external diameter of 28 mm, and a height of the regeneration/stripping zone of 60 mm) are now discussed. Water and/or crude oil emulsion was injected at room temperature at the top of the reactor using an HPLC pump. Several mass flow controllers were used to inject at the bottom of the reactor the fluidization/regeneration gas. At the outlet of the four zones reactor, several traps allowed to collect liquid fractions for further analysis (SIMDIS analyses) and a microGC recorded gas fraction during cracking reactions ($C_1$-$C_4$ hydrocarbons). The liquid samples were analyzed using a 7890A GC system (Agilent) upgraded for High Temperature SIMDIS analyses and a 7693A Automatic Liquid Sampler (Agilent). Helium was used as a carrier gas for FID detector and GC column was a DB-HT Sim Dis (5 m×0.53 mm I.D., 0.15 μm). All samples were diluted with Carbon Disulfide (CS2) as recommended by ASTM D2887 and D6325. Gas fractions (C1-C4 hydrocarbons) were recorded using a SRA Instruments, model T-3000, equipped with three μ-columns and TCD detector for each one, using helium as carrier gas. Specifications: (i) Molsieve 5A column (10 m/46° C./16 psi) for N2, O2, CO and $CH_4$ detection, (ii) PPU column (8 m/50° C./30 psi) for CO2 detection, (iii) Alumina column (10 m/49.5° C./16 psi) for C2-C4 hydrocarbons detection.

In order to compare the different experiments, gas yields reported on these examples are average values after 1 h of cracking. The temperature was recorded at the reaction zone with a thermowell located at the level of the feeding pipe. For all examples presented below, the flow of the liquid water was 0.25 mL/min and the total flow of regeneration/fluidization gas at room temperature was 400 mL/min. All catalytic cracking experiments were performed using around 25 to 35 g of commercial equilibrium FCC catalyst and Arabian Light crude oil. Prior to the experiments, the commercial FCC catalyst was calcined at 800° C. for 10 h.

The stream to be cracked presented the properties shown in Table 1.

TABLE 1

| Properties Arabian Light | |
|---|---|
| Final Boiling Point (° C.) | 702.5 |
| Recovery mass at 220° C. (%) | 39.5 |
| Bulk density (kg/m$^3$) | 833 |
| Total Sulfur (wt %) | 1.88 |
| N (ppm) | 1000 |
| C (wt %) | 73.9 |
| H (wt %) | 10.7 |
| Ni (ppm) | 6 |
| V (ppm) | 14 |

First, cracking of the Arabian Light was performed at 520° C. in the absence of the commercial FCC catalyst in order to assess the effect of the thermal cracking (experiment number 1). Then, several catalytic cracking tests were performed using the commercial FCC catalyst (experiments number 2 to 5) and varying several operating conditions such as the percentage of oxygen in the regeneration/fluidization gas (experiment number 2), the flow of the Arabian Light (experiment number 4) and the temperature of the reaction zone (experiment number 5). The results of thermal and catalytic cracking of the crude oil using the four zones fluidized process are presented in Table 2.

TABLE 2

| Experiment number | 1 | 2 | 3 | 4 | 5 |
|---|---|---|---|---|---|
| Flow AL (mL/min) | 0.18 | 0.18 | 0.18 | 0.4 | 0.25 |
| % $O_2$ in fluidization gas | 0 | 10 | 0 | 0 | 0 |
| T reaction zone (° C.) | 520 | 520 | 520 | 520 | 570 |
| Residence time (s) | NA | 0.8 | 0.8 | 0.8 | 0.8 |
| Overall Cat/Oil ratio | NA | 0.9 | 0.6 | 0.3 | 1 |
| $C_1$-$C_4$ gas yield (wt %) | 5 | 34 | 33 | 26 | 32 |
| Ethylene yield (wt %) | <1 | 2 | 2 | 2 | 4 |
| Propylene yield (wt %) | <1 | 6 | 8 | 7 | 11 |
| $C_4$ olefins yield (wt %) | 3 | 6 | 10 | 7 | 7 |
| Final Boiling Point (° C.) | 672 | — | 559 | 568 | 534 |
| Recovery mass at 220° C. (%) | 20 | — | 38 | 41 | 38 |

Figure 10:
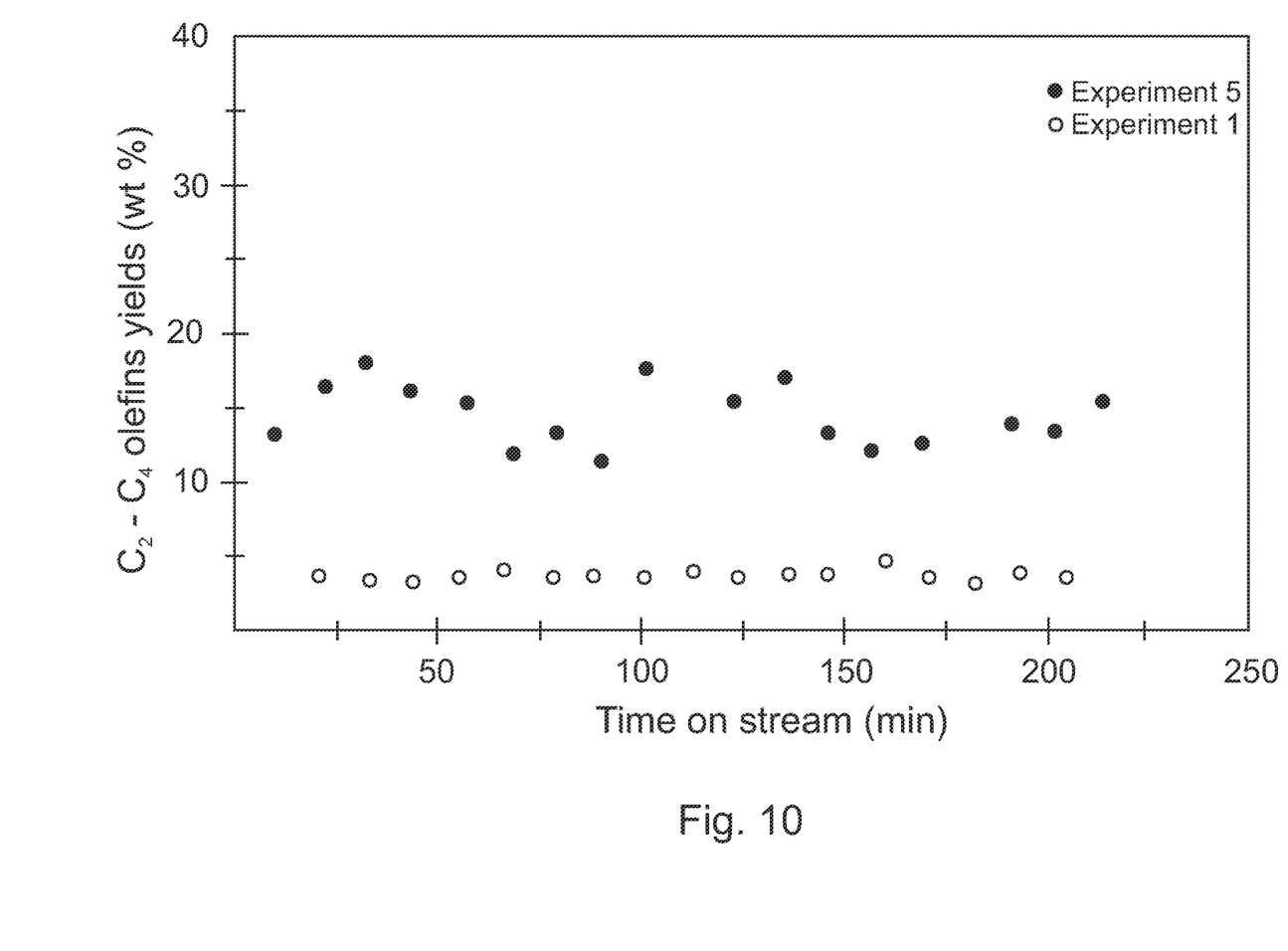
FIG. 10 illustrates the yield of light olefins over time in the catalytic system.

A small amount of light olefins, less than 4 wt %, were recorded during experiment number 1, as the thermal cracking was not significant at this temperature of reaction. By adding the commercial FCC catalysts, the C1-C4 gas yield increased from 5 wt % to around 30 wt %, depending of the operating conditions used during the catalytic cracking reaction. The liquid analyses indicated also that heaviest hydrocarbons were cracked to more valuable light fractions in the presence of the catalysts. Highest yield of light olefins was recorded when the multi-zones reactor was operated at 570° C. and in the absence of oxygen in the regeneration/fluidization gas. Moreover, the multi-zones reaction unit presented in one of FIGS. 2 and 4-8 resulted in a very stable yield of light olefins for more than 200 min, as shown in FIG. 10.

Finally, the cracking of the Arabian Light was performed using a fixed bed of commercial FCC catalyst (5 g) and under similar operating conditions as the experiment number 3. The results of this comparative example are reported in Table 3. It is noted that due to the reaction unit shown in one of the FIGS. 2 and 4-8, the yield of light olefins increased from 8 wt % to 20 wt % in comparison to the fixed bed mode experiment using similar operating conditions.

TABLE 3

| Experiment number | 3 | Comparative example |
|---|---|---|
| Flow AL (mL/min) | 0.18 | 0.25 |
| % $O_2$ in fluidization gas | 0 | 0 |
| Treaction zone (° C.) | 520 | 520 |
| $C_1$-$C_4$ gas yield (wt %) | 33 | 9 |
| Ethylene yield (wt %) | 2 | <1 |
| Propylene yield (wt %) | 8 | 4 |
| $C_4$ olefins yield (wt %) | 10 | 4 |
| Final Boiling Point (° C.) | 559 | 626 |
| Recovery mass at 220° C. (%) | 38 | 27 |

The disclosed embodiments provide a novel reaction unit for a FCC system for transforming hydrocarbon feedstocks to petrochemicals with a catalytic process. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A reaction unit for catalytic conversion of a hydrocarbon or hydrocarbon containing feedstock to a petrochemical mixture, the reaction unit comprising:
   a housing;
   a fluid bed distributor plate located at a bottom of the housing;
   a regeneration zone and a stripping zone located above the fluid bed distributor plate, in which catalytic particles are housed;
   a reaction zone located above the stripping zone; and
   a condensation zone located above the reaction zone, in which a petrochemical product fluid is condensed,
   wherein each of the regeneration zone, the stripping zone, the reaction zone, and the condensation zone is located within the housing so that each zone is in direct contact with at least another zone within the housing.

2. The reaction unit of claim 1, wherein the housing is a single housing and the regeneration zone, the stripping zone, the reaction zone, and the condensation zone are located in the single housing.

3. The reaction unit of claim 1, wherein the regeneration zone, the stripping zone, the reaction zone, and the condensation zone have the same or different temperatures.

4. The reaction unit of claim 1, further comprising:
   a feeding pipe that supplies the hydrocarbon or hydrocarbon containing feedstock to the reaction zone.

5. The reaction unit of claim 4, wherein reaction products heats up the hydrocarbon feedstock inside the feeding pipe.

6. The reaction unit of claim 4, wherein the feeding pipe extends through the condensation zone and the reaction zone.

7. The reaction unit of claim 4, wherein the feeding pipe extends through the regeneration zone, the stripping zone and the reaction zone.

8. The reaction unit of claim 4, wherein the feeding pipe includes (1) a first pipe that extends through the condensation zone and then through the reaction zone, and (2) a second pipe that extends through the stripping zone and/or the regeneration zone into the reaction zone.

9. The reaction unit of claim 1, further comprising:
   a bottom port located at a bottom of the housing and configured to supply a fluidization gas and/or catalyst regeneration gases to the reactor regeneration zone and the stripping zone through the fluid bed distributor plate.

10. The reaction unit of claim 1, wherein the fluidization gas could be one or more gases of N2, steam, air, O2, CO2, CO, or their combinations.

11. The reaction unit of claim 1, wherein the hydrocarbon or hydrocarbon containing feedstock includes crude oil, refinery products, and other oxygenates.

12. The reaction unit of claim 1, wherein the hydrocarbon feed or hydrocarbon containing feedstock is fed to the housing premixed with water.

13. The reaction unit of claim 1, wherein a volume of the condensation zone is different from a volume of the reaction zone.

14. The reaction unit of claim 1, wherein a volume of the reaction zone is different from a volume of the regeneration and stripping zones.

15. The reaction unit of claim 1, further comprising:
a catalyst inlet attached to the housing that supplies, continuously or intermittently, during the cracking process, fresh catalyst particles to the reaction zone; and
a catalyst outlet attached to the housing that removes, continuously or intermittently, during the cracking process, catalyst particles laced with metals.

16. A method for catalytic conversion of a hydrocarbon feedstock or a hydrocarbon containing feedstocks to a petrochemical fluid, the method comprising:
supplying the hydrocarbon or hydrocarbon containing feedstock to a reaction zone, located in a single reaction unit;
supplying a fluidization gas to the reaction zone through a regeneration zone and a stripping zone, also located in the single reaction unit;
converting the hydrocarbon feedstock into the petrochemical fluid, in the reaction zone, in the presence of catalytic particles; and
condensing the petrochemical fluid in a condensation zone, also located in the single reaction unit,
wherein the reaction zone is sandwiched between the condensation zone and the regeneration and stripping zones, and
wherein each of the regeneration zone, the stripping zone, the reaction zone, and the condensation zone is located within the single reaction unit so that each zone is in direct contact with at least another zone within the single reaction unit.

17. The method of claim 16, wherein the single reaction unit is operating with a reaction temperature between 400° C. and 1000° C., a regeneration temperature is between 500° C. and 1000° C., a feedstock residence time is between 0.05 and 100 s, and a pressure is between 0.1 and 30 bar.

18. The method of claim 16, wherein the hydrocarbon feedstock is supplied along a pipe to the reaction zone.

19. The method of claim 17, wherein the fluidization gas is supplied at a bottom port, located at a bottom of the housing, to the regeneration zone.

20. The method of claim 17, wherein the petrochemical fluid passes from the reaction zone into the condensation zone.

21. The method of claim 19, further comprising:
heating up the hydrocarbon feedstock inside the pipe with the petrochemical fluid in the condensation zone.

22. The method of claim 17, wherein the pipe extends through the condensation zone and the reaction zone.

23. The method of claim 17, wherein the pipe extends through the regeneration/stripping zone and the reaction zone.

24. The method of claim 17, wherein the feeding pipe includes (1) a first pipe that extends through the condensation zone and the reaction zone, and (2) a second pipe that extends through the regeneration/stripping zone and the reaction zone.

25. The method of claim 16, wherein a volume of the condensation zone is larger than a volume of the reaction zone.

26. The method of claim 16, wherein a volume of the reaction zone is larger than a volume of the regeneration/stripping zone.

27. The method of claim 16, wherein the hydrocarbon feedstock includes crude oil.

28. The method of claim 16, wherein the catalytic particles are supplied with the hydrocarbon feedstock.

* * * * *